(12) United States Patent
Ronchi

(10) Patent No.: US 6,557,691 B2
(45) Date of Patent: May 6, 2003

(54) DEVICE FOR CONTAINER REARRANGING MACHINES, PROVIDED WITH AUTOMATIC MEANS FOR DIRECTING AND DROPPING THE CONTAINER RECEIVED

(75) Inventor: Mario Ronchi, Cologno Monzese (IT)

(73) Assignee: Ronchi Mario S.p.A., Gessate (IT)

(*) Notice: Subject to any disclaimer, the term of this patent is extended or adjusted under 35 U.S.C. 154(b) by 45 days.

(21) Appl. No.: 09/801,003

(22) Filed: Mar. 8, 2001

(65) Prior Publication Data
US 2001/0022260 A1 Sep. 20, 2001

(30) Foreign Application Priority Data
Mar. 8, 2000 (IT) .......................................... MI20A0461

(51) Int. Cl.⁷ ............................................... B65G 47/24
(52) U.S. Cl. ................................... 198/400; 198/397.02
(58) Field of Search .............................. 198/400, 397.02

(56) References Cited

U.S. PATENT DOCUMENTS

| | | | |
|---|---|---|---|
| 3,650,368 A | | 3/1972 | Nalbach |
| 3,934,716 A | * | 1/1976 | Heckel ........................ 198/252 |
| 4,130,194 A | | 12/1978 | Schindel et al. |
| 4,681,209 A | | 7/1987 | Marti |
| 5,415,322 A | * | 5/1995 | Sala ........................... 198/392 |
| 6,098,781 A | * | 8/2000 | Lanfranchi .................. 198/400 |
| 6,116,406 A | * | 9/2000 | Marti Sala .................. 198/395 |

* cited by examiner

Primary Examiner—Douglas Hess
(74) Attorney, Agent, or Firm—Dykema Gossett PLLC

(57) ABSTRACT

Device for receiving, directing and dropping containers arranged randomly inside hoppers of rearranging machines and the like, which is formed by at least two side walls and by a back wall and comprises automatic rotating mechanisms for directing the container, which are arranged inside the device and extend in a substantially transverse direction with respect thereto, which mechanisms may be rotationally actuated by associated actuators so as to cause dropping of the container present inside the device, directed in a predefined manner.

14 Claims, 4 Drawing Sheets

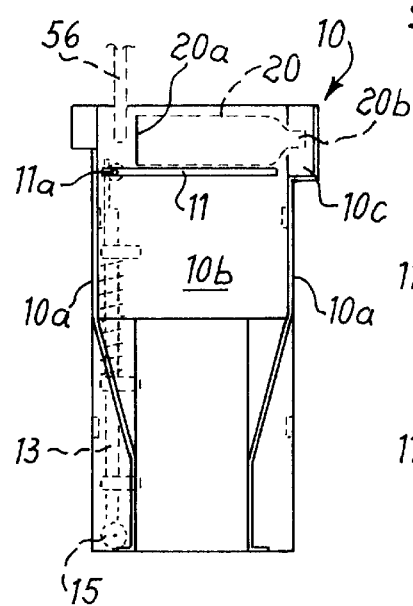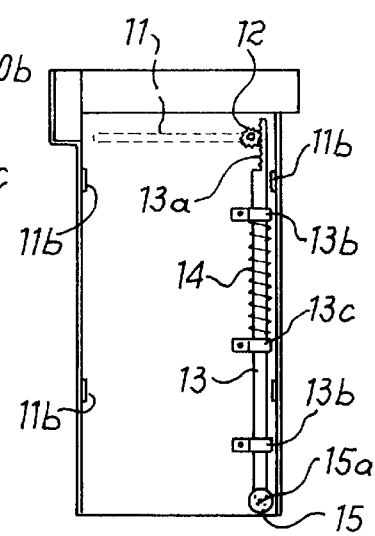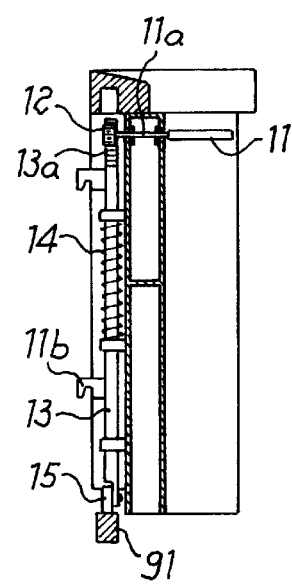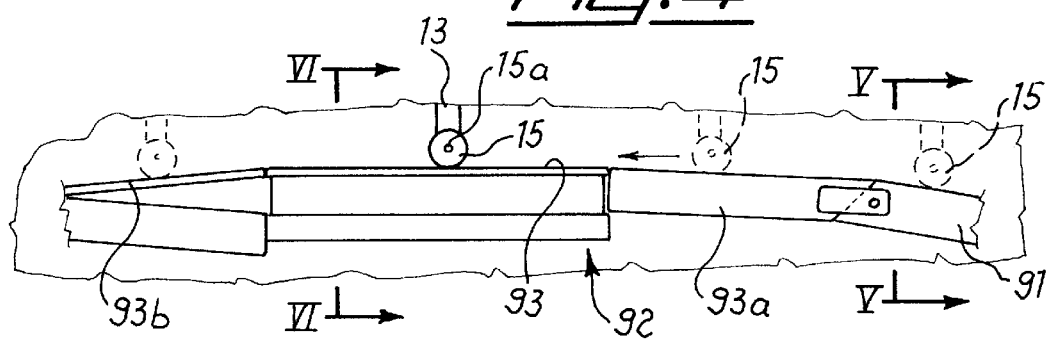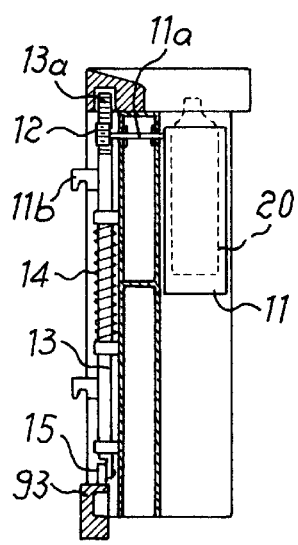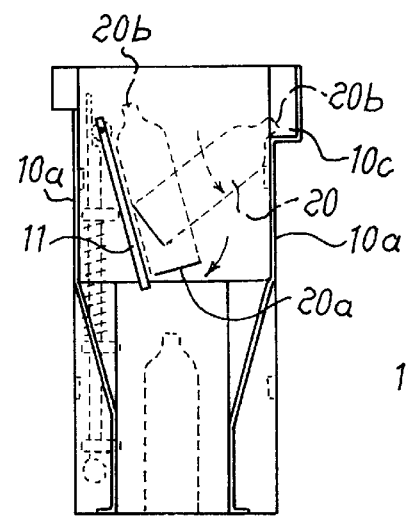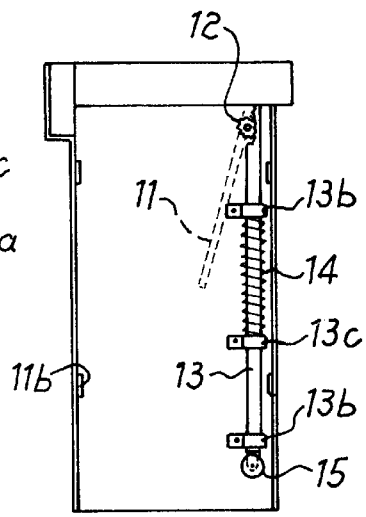

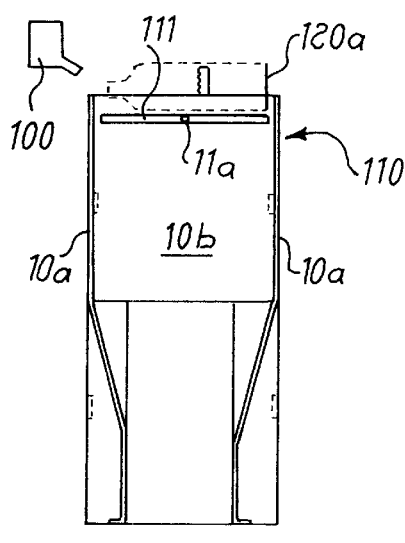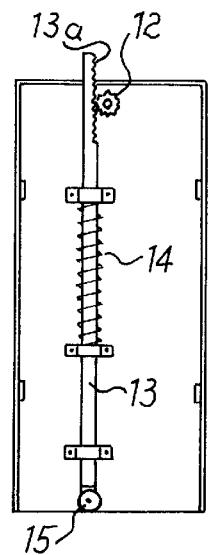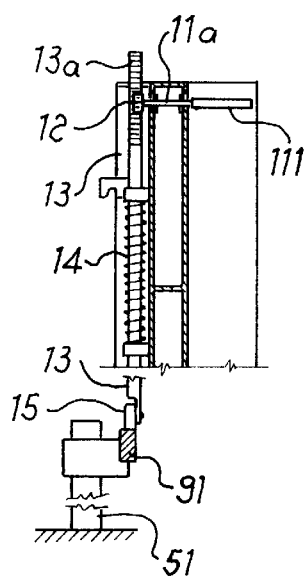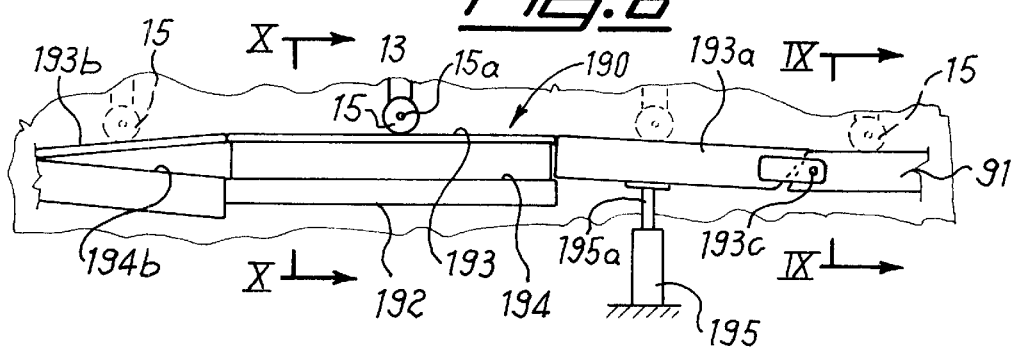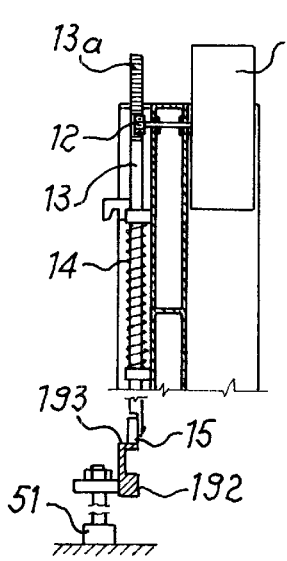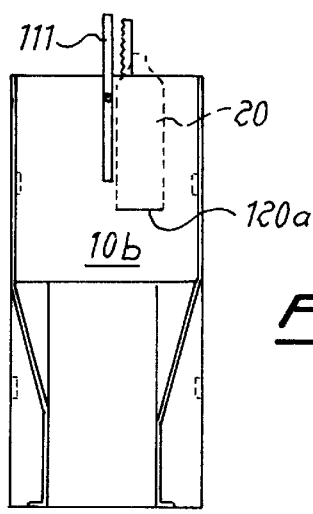

DEVICE FOR CONTAINER REARRANGING MACHINES, PROVIDED WITH AUTOMATIC MEANS FOR DIRECTING AND DROPPING THE CONTAINER RECEIVED

DESCRIPTION

The present invention relates to a device for receiving, directing and dropping containers such as bottles and the like, in particular for automatic rearranging machines, which is provided with automatic means for directing the said container, arranged inside it.

It is known in the technical sector relating to the filling and packaging of containers that there exists the need to perform a preliminary operation involving rearrangement of said containers in order to ensure that the downstream filling machines receive containers which are all correctly directed with their neck and/or opening directed upwards.

This rearrangement is performed by means of so-called rotary rearranging machines which must be provided with devices designed to receive said containers individually from a hopper containing them in a random manner and subsequently drop them, all directed in the same manner, with the mouth upwards, onto the belt for removing and transporting them to the filling machine. Numerous examples of embodiment of said sorting and straightening devices associated with dropping chutes have been described in U.S. Pat. No. 3,650,368, DE-26 51 495 and DE-34 13 234.

These devices, however, are based on co-operation with an annular disk fixed to the machine and supporting the container up to a predefined angular position where the disk is interrupted so as to allow the container to fall.

In addition to the need for a fixed disk, the sorting devices of the known type cannot be easily adapted to the different shapes or sizes of the containers to be straightened, making it necessary to change the sorting device and/or the dropping chute associated with it, even when there is only a small variation in the said shape or size.

The technical problem which is posed, therefore, is that of providing a device for receiving and dropping containers contained randomly inside hoppers of rearranging machines, which is able to perform automatically also directing thereof, once they have been arranged inside the device.

Within the context of this problem a further requirement is that the device should be able to be easily applied to machines of the known type tangentially with respect thereto and be able to increase the possibility of straightening containers of different sizes without the need for changing the sorting device.

These technical problems are solved according to the present invention by a device for receiving, directing and dropping containers arranged randomly inside hoppers of rearranging machines and the like, which is formed by at least two side walls and by a back wall and comprises automatic rotating means for directing the container, which are arranged inside the device and extend in a substantially transverse direction with respect thereto, which means may be rotationally actuated by means of associated actuators so as to cause dropping of the container present inside the device, directed in a predefined manner.

Further details may be obtained from the following description of a non-limiting example of embodiment of the invention, provided with reference to the accompanying plates of drawings in which:

FIGS. 3a, 3b show respectively a front view and rear view of a device for receiving, directing and dropping containers according to the present invention with the directing lever in the rest position;

FIG. 4 shows a front view of the cam means for actuating the device according to FIG. 3a;

FIG. 5 shows a cross-section along the plane indicated by V—V in FIG. 4;

FIG. 6 shows a cross-section along the plane indicated by VI—VI in FIG. 4;

FIGS. 6a, 6b show a front view and rear view, respectively, of the device according to FIG. 6;

FIGS. 7a, 7b show a front view and rear view, respectively, of a second example of embodiment of the device according to the invention shown in FIG. 3, with the directing lever in the rest condition;

FIG. 8 shows a front view of the cam means for actuating in the clockwise direction the directing lever of the device according to FIG. 7a;

FIG. 9 shows a cross-section along the plane indicated by IX—IX in FIG. 8;

FIG. 10 shows a cross-section along the plane indicated by X—X in FIG. 9;

FIG. 11 shows a front view of the device according to FIG. 10 with the directing lever rotated in the clockwise direction;

Figure 1:
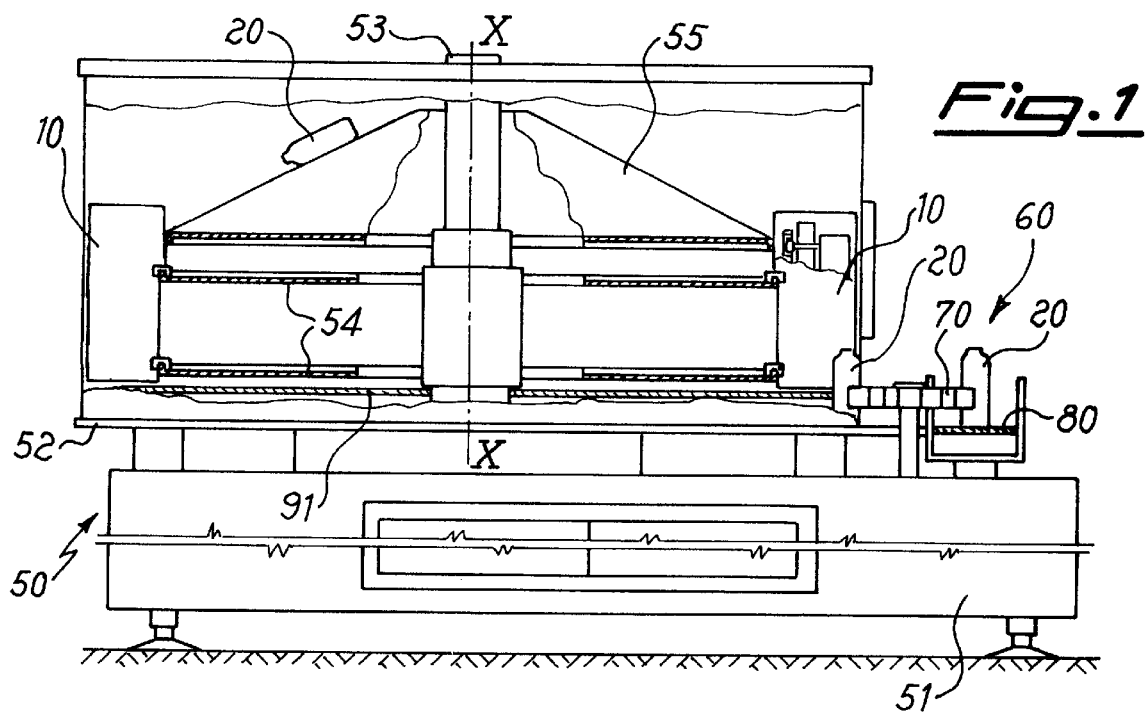
FIG. 1 shows a partially sectioned side view of a rearranging machine provided with a device for receiving, directing and dropping the container according to the invention.
Figure 2:
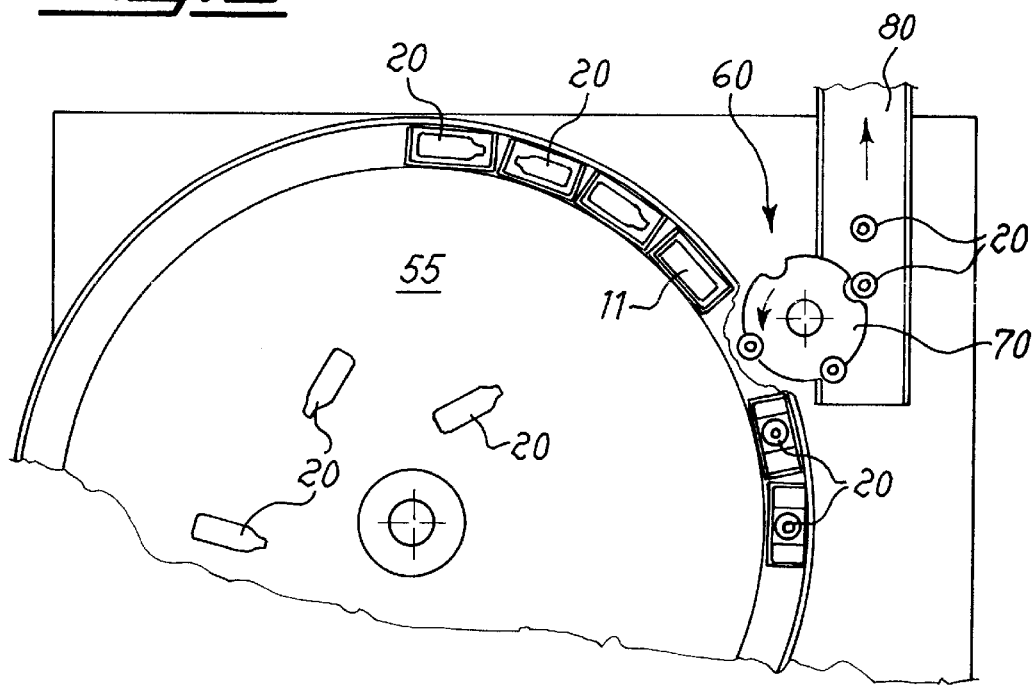
FIG. 2 shows a top plan view of the machine according to FIG. 1.
Figure 12:
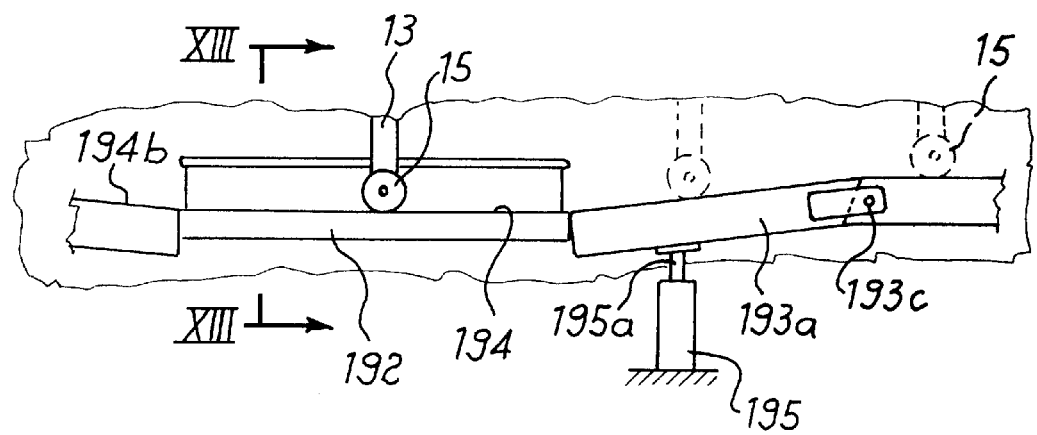
FIG. 12 shows a front view of the cam means for actuating the device according to FIG. 7a, with rotation of the directing lever in an anti-clockwise direction.
Figure 13:
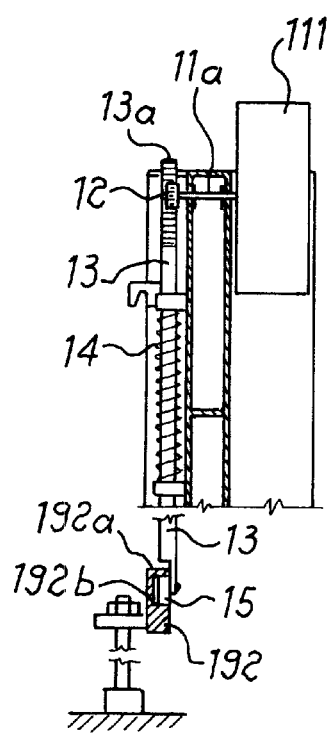
FIG. 13 shows a cross-section along the plane indicated by XIII—XIII in FIG. 12.
Figure 14:
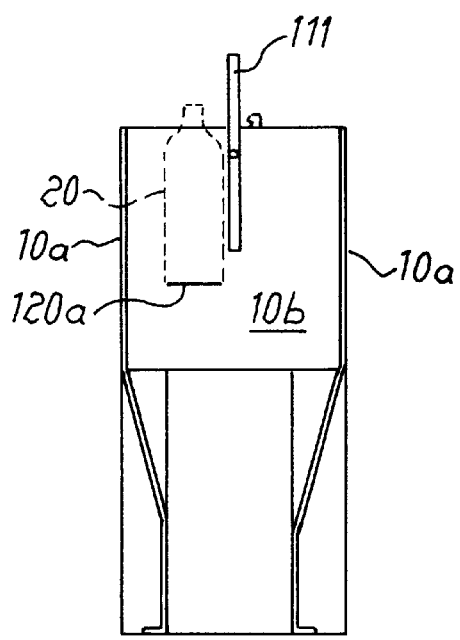
FIG. 14 shows a front view of the device according to FIG. 13 with the directing lever rotated in the clockwise direction.

As illustrated in FIGS. 1 and 2, the machine 50 according to the invention is essentially composed of a base 51 supporting a cylindrical hopper 52 with a vertical longitudinal axis X—X.

Said cylindrical hopper 52 has, arranged inside it, a coaxial shaft 53 which is motorized in a known manner and therefore not described and on which there is keyed a pair of horizontal rings 54 rotating in unison with the shaft and a frustoconical element 55, counter-rotating with respect to the underlying rings 54.

Discharging of the containers 20 from the machine is envisaged in a predefined angular zone 60 of the base, said discharging operation being performed by associated container removal means 70 which remove the said container and deposit it onto a conveyor belt 80.

Removal of the container 20 from the hopper 52 is performed by receiving, directing and dropping devices 10 which are mounted tangentially on the rotating rings 54 which ensure retention thereof. Each receiving, directing and dropping device 10 (FIG. 3a) consists of two parallel and facing side walls 10a which are connected together by a back wall 10b which determines the width of the device.

In their upper part the side walls of the device are apparently shaped in a known manner so as to define a seat 10c widened in the lateral/tangential direction and able to contain, if possible, the neck 20b of the container, but not the bottom 20a.

The rear part of the back wall 10b is provided with elements for fixing to parts of said rearranging machines, which in the example consist of pairs of hooks 11b arranged above each other at a distance corresponding to the axial distance of the disks 54 to which the devices must be secured.

The means 10 described above also have, associated with them, means for directing the container 20 which has entered the device, consisting of a directing lever 11 arranged at a suitable distance from the top edge of the device 10 and extending substantially over the whole width of the device 10. One end of said directing lever 11 is joined to a first end of a transverse pin 11a which has, at its other end, a pinion 12 in turn meshing with a rack 13a formed on the end section of a rod 13 attached to the rear surface of the back wall 10b.

In greater detail said rod 13 is kept in contact with the back wall 10b of the device 10 by a pair of bridge-pieces 13b which prevent separation from said wall, but which allow a translatory movement in both senses in a direction parallel to the vertical axis X—X.

A spring 14 which tends to retain the rod 13 in a predefined axial position is arranged between one of said bridge-pieces 13b and a stop element 13c joined to the rod 13. A roller 15 with a horizontal axis 15a is arranged at the end of the rod 13 opposite to that of the rack 13a.

As shown in FIG. 4, said roller forms the element designed to follow the profile of a rectilinear cam 90 formed by a ring 91 extending circumferentially over 360° and joined to the base 51 of the machine coaxially with the rings 54 supporting the sorting devices (FIG. 1).

Said ring comprises a section 92 with a cam profile 93 having a rising ramp 93a and a falling ramp 93b which are travelled along by the cam-following roller 15.

The operating principle of the device and machine is as follows:
once the containers 20 have been loaded randomly into the hopper 52 and rotation of the shaft 53 started, counter-rotation of the rings 54 and the frustoconical bell member 55 produces a centrifugal force on the individual containers which tend to move radially towards the periphery and enter into the receiving devices 10, being arranged in a tangential direction; during this step the container may enter the device 10 with the neck arranged either at the rear (FIG. 3a) and hence inside the seat 10c or at the front (not shown) with respect to the direction of rotation of the said device;
a fixed stop 56 (schematically shown in FIG. 3a in broken lines) arranged in the vicinity of the zone for dropping/exit of the container 20 pushes the container towards the rear side of the device 10 and starts the sequence for directing and dropping the container.
In particular:
the roller 15 travels along the rising ramp 93a of the cam 90, forcing the rod 13 upwards against the thrusting action of the spring 14;
if the container 20 (FIG. 3a) has entered the device with its bottom 20a directed in front of the neck 20b with respect to the direction of rotation of the device, the subsequent lowering of the directing lever 11 due to rotation of the pinion 12 meshed with the rack 13a causes the bottom 20a of the container to fall since the neck 20b is retained by the seat 10c in the rear side of the device 10;
the container therefore falls straight, with the bottom underneath and the neck at the top (FIG. 6a).
It is emphasized that these means for retaining the neck of the container are known per se in the art and therefore are not described in detail.
Alternatively, in the case where:
the container 20 has entered the device with the bottom 20a at the rear of the neck 20b with respect to the direction of rotation of the device;
subsequent lowering of the directing lever 11 due to rotation of the pinion 12 meshed with the rack 13a causes dropping of the bottom 20a of the container since the inclined surface formed by the lever 11 retains the neck 20b for a certain period of time;
the container therefore falls straight, with the bottom underneath and the neck at the top (FIG. 6a).

In the embodiment described above the lever 11 is able to rotate only in the clockwise direction and the rotational pin 11a must be arranged on the front side 10a of the device 10 relative to the direction of rotation of the said device.

However, it is envisaged that the device may be designed so as to achieve bidirectional rotation of the directing lever 111, which is particularly effective in the case of containers 120, which are substantially devoid of a neck able to co-operate with the device 10 so as to cause directing of the container and therefore falling thereof always with its bottom underneath.

In this bidirectional configuration (FIGS. 7a, 7b) the container 110 has the lever 111 connected to the pivot pin 11a and therefore to the pinion 12 in a central position of the device widthwise; correspondingly the actuating rod 13 will be arranged substantially in the centre of the back wall 10b of the device.

The cam means 190 of the ring 91 comprise a section with a first higher profile 193 and a second lower profile 194, onto which the roller 15 may be selectively deviated as a result of a further section 193a of the ring 91 which forms a rising/falling ramp rotationally movable about a hinging pin 193c, joined to the remaining fixed section of the circumferential ring 91. Actuation of the said rotating ring section 193a is performed by the stem 195a of a cylinder 195 which is in turn controlled by a device 100 (FIG. 7a) for detecting the shape of the container and therefore its direction inside the sorting device before dropping.

The operating principle of the machine is as follows:
once the containers 20 have been randomly loaded inside the hopper 52 and the shaft 53 made to rotate, counter-rotation of the rings 54 and the frustoconical bell member 55 produces a centrifugal force on the individual containers which tend to move radially towards the periphery and enter into the receiving devices 10, being arranged in a tangential direction; during this step the container 20 may enter into the device 10 with the bottom 120a arranged either at the rear (FIG. 7a) or at the front (not shown) with respect to the direction of rotation of the said device;
during rotation of the device 110, corresponding to the container receiving step, the roller 15 travels along the flat ring section 91 located at a height such as to keep the rod 13 in a vertical position where the directing lever 111 remains in a horizontal position;
once the container has entered the device 10 and rotation of the rings 54 has brought said device into the vicinity of the exit zone 60, the sequence for directing the container commences, namely:

the detector 100 detects the absence of the bottom 120*a* of the container;

the cylinder 195 is actuated so as to move the stem 195*a* into the extracted position so that the section 193*a* of the ring 91 is raised and forms the rising ramp, level with the upper profile 193*a* of the cam 190;

in these conditions the roller 15 travels up the upper profile part of the cam, causing the upwards return movement of the rod 13 against the thrusting action of the spring 14;

the upwards return movement of the rod 13 causes the rotation, in a clockwise direction, of the pinion 12 and therefore the clockwise rotation of the directing lever 111;

the clockwise rotation of the lever 111 causes the container 120 to drop with the bottom 120*a* underneath so that it may be removed by the discharge devices 70, 80.

If, on the other hand, the container 120 has entered the device 10 with the bottom 120*a* at the front with respect to the direction of rotation of the device:

the detector 100 sends a corresponding signal for detecting the bottom to the cylinder 195 so that the latter retracts the stem 195*a* so as to bring the movable section 193*a* of the ring 91 into a position aligned with the bottom profile of 194 of the cam 192;

in these conditions, the roller 15 travels down the bottom profile part of the cam, causing the downwards movement of the cam 13 pushed by the spring 14;

the downwards movement of the rod 13 causes the anti-clockwise rotation of the pinion 12 and therefore the anti-clockwise rotation of the directing lever 111;

the anti-clockwise rotation of the lever 111 causes the container to fall again with the bottom 120*a* underneath so that it may be removed by the discharge devices 70, 80.

It is pointed out how the bidirectional directing lever allows the said device to be used independently of the direction of rotation of the machine, this being particularly useful in the case of two machines which are arranged alongside and supply the same exit belt and which must therefore be counter-rotating.

What is claimed is:

1. Device for receiving, directing and dropping containers arranged randomly inside hoppers of rearranging machines, which is formed by at least two side walls and by a back wall, characterized in that said device comprises automatic rotating means for directing the container, which are arranged inside the device, which means may be rotationally actuated by means of associated actuators so as to cause dropping of the container present inside the device, directed in a predefined manner, said automatic means consist of a lever extending substantially over an entire width of the device, said lever is joined to one end of a pin, on the other end of which a first component of the said rotational actuating means is mounted.

2. Device according to claim 1, characterized in that said first component of the rotational actuating means is a pinion.

3. Device according to claim 1, characterized in that said device envisages a seal for receiving the neck of the container.

4. Device according to claim 1, characterized in that said device comprises two chambers arranged alongside each other for receiving containers after they have dropped and associated alternate opening/closing means for entry into said chambers.

5. Device according to claim 4, characterized in that said chambers are defined by the side walls of the device and by a partition inside the device itself and substantially parallel to said walls.

6. Device according to claim 5, characterized in that said opening/closing means consist of an arm pivotably mounted on said partition and rotationally movable by associated actuating means.

7. Rotating machine for rearranging containers such as bottles, comprising a hopper for randomly containing the containers, a pair of parallel rings rotating in unison with a shaft to which they joined, characterized in that said machine comprises a plurality of devices according to claim 1, or receiving, directing and dropping said containers, said devices being fixed tangentially to said rings.

8. Device for receiving, directing and dropping containers arranged randomly inside hoppers of rearranging machines, which is formed by at least two side walls and by a back wall, characterized in that said device comprises automatic rotating means for directing the container, which are arranged inside the device, which means may be rotationally actuated by means of associated actuators so as to cause dropping of the container present inside the device, directed in a predefined manner, said rotational actuating means consist of a rod, a first end of which is formed in the manner of a rack and on the opposite end of which a cam-following roller is mounted.

9. Device according to claim 8, characterized in that said rod is translatably movable in the vertical direction upon actuation of cam means and against the thrusting action of resilient means.

10. Device according to claim 9, characterized in that the translation of said rod occurs in one direction only.

11. Device according to claim 10, characterized in that the actuating cam comprises a rising ramp, a straight section and a falling ramp.

12. Device according to claim 9, characterized in that the translation of said rod occurs in both directions.

13. Device according to claim 12, characterized in that the actuating cam comprises a movable rising/falling ramp, a first upper straight section, a second lower straight section and a rising/falling ramp.

14. Device according to claim 13, characterized in that said movable ramp of the cam is rotationally actuated about a fixed pivot by means of a cylinder.

* * * * *